(12) United States Patent
Wei et al.

(10) Patent No.: US 9,497,436 B2
(45) Date of Patent: Nov. 15, 2016

(54) VIRTUAL SPORT SYSTEM USING START SENSOR FOR ACCURATE SIMULATION OF MOVEMENT OF A BALL

(75) Inventors: Ching-Ming Wei, Hsin-Chu (TW); Hsing-Chuan Yu, Hsin-Chu (TW); Yu-Chieh Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 312 days.

(21) Appl. No.: 13/346,731

(22) Filed: Jan. 10, 2012

(65) Prior Publication Data

US 2013/0093754 A1   Apr. 18, 2013

(30) Foreign Application Priority Data

Oct. 14, 2011   (TW) .............................. 100137288 A

(51) Int. Cl.
*G06T 15/00* (2011.01)
*G06K 9/00* (2006.01)
*H04N 13/00* (2006.01)
*H04N 13/04* (2006.01)

(52) U.S. Cl.
CPC ...... *H04N 13/0018* (2013.01); *H04N 13/0404* (2013.01); *H04N 13/0434* (2013.01); *H04N 13/0438* (2013.01)

(58) Field of Classification Search
CPC ....... G06T 19/00; G06T 19/20; G06T 17/20; G06T 17/205; G06T 17/00; G06T 17/10; G06T 2207/10024; G06T 2207/20228; H04N 13/0431; H04N 13/0459; G02B 6/0018; G09G 2300/023; G09G 2320/0646; G01B 9/02002; G01B 9/02036; G02C 7/104; G02C 7/12; G03C 9/06; H04L 12/1822

USPC ......................................................... 345/419
See application file for complete search history.

(56) References Cited

U.S. PATENT DOCUMENTS

| | | | | |
|---|---|---|---|---|
| 4,895,431 A | * | 1/1990 | Tsujiuchi et al. | 359/29 |
| 6,151,062 A | * | 11/2000 | Inoguchi et al. | 348/51 |
| 7,878,976 B2 | * | 2/2011 | Patch et al. | 600/438 |
| 2005/0046799 A1 | * | 3/2005 | Pezzaniti | 353/10 |
| 2009/0167639 A1 | | 7/2009 | Casner | |
| 2009/0225183 A1 | | 9/2009 | Tamura | |
| 2010/0002073 A1 | * | 1/2010 | Robinson et al. | 348/42 |
| 2011/0025832 A1 | | 2/2011 | Cowan | |
| 2011/0080401 A1 | * | 4/2011 | Tan et al. | 345/419 |
| 2012/0114260 A1 | * | 5/2012 | Takahashi et al. | 382/238 |

FOREIGN PATENT DOCUMENTS

CN   101527773 A   9/2009
CN   101895778 A   11/2010

OTHER PUBLICATIONS

"A perceptual approach for stereoscopic rendering optimization" by Bulbul et al., published on Computers & Graphics 34 2010, 145-157.*

* cited by examiner

*Primary Examiner* — Gregory J Tryder
*Assistant Examiner* — Kwang Lee
(74) *Attorney, Agent, or Firm* — WPAT, PC; Justin King; Jonathan Chiang

(57) ABSTRACT

A 3D image processing method includes providing image data, generating a first visual angle image and a second visual angle image according to the 3D image data, blurring the first visual angle image, enhancing the second visual angle image, and displaying the blurred first visual angle image and the enhanced second visual angle image. The 3D image processing method reduces a ghost effect when watching 3D images.

22 Claims, 7 Drawing Sheets

VIRTUAL SPORT SYSTEM USING START SENSOR FOR ACCURATE SIMULATION OF MOVEMENT OF A BALL

BACKGROUND OF THE INVENTION

1. Field of the Invention

The present invention relates to a 3D image processing method, and more particularly, to a 3D image processing method with a reduced ghost effect.

2. Description of the Prior Art

Please refer to FIG. 1. FIG. 1 is a diagram illustrating a 3D image processing method of the prior art. As shown in FIG. 1, when a 3D display device 100 receives image data LR, an image processing unit 110 of the 3D display device 100 generates a left visual angle image L and a right visual angle image R according to the image data LR. Then, a display panel 120 of the 3D display device 100 displays the left visual angle image L and the right visual angle image R to be seen by a left eye and a right eye of a user respectively in order to form a 3D image visually.

There are two kinds of methods for displaying the left visual angle image L and the right visual angle image R by the 3D display device 100. In one method, the display panel 120 displays the left visual angle image L and the right visual angle image R simultaneously, and utilizes an optical polarization component for arranging a polarization direction of the left visual angle image L to be different from a polarization direction of the right visual angle image R, and a left eye and a right eye of a user can see the left visual angle image L and the right visual angle image R respectively through a pair of polarized glasses. In another method, the display panel 120 displays the left visual angle image L and the right visual angle image R sequentially, and the left eye and the right eye of the user can see the left visual angle image L and the right visual angle image R respectively through a pair of shutter glasses, which shutter a left glass and a right glass sequentially.

However, the above 3D display methods might generate ghost images due to wrong shuttering timing or poor polarization ability, such that a ghost effect arises, where the left eye sees the right visual angle image R partially or the right eye sees the left visual angle image L partially. Consequently, the user will see one object has two edges.

SUMMARY OF THE INVENTION

The present invention provides a 3D image processing method. The method comprises providing image data, generating a first visual angle image and a second visual angle image according to the image data, blurring the first visual angle image, enhancing the second visual angle image, and displaying the blurred first visual angle image and the enhanced second visual angle image.

The present invention further provides a 3D display device. The 3D display device comprises an image processing unit and a display panel. The image processing unit is for receiving image data, generating a first visual angle image and a second visual angle image according to the image data, and blurring the first visual angle image as well as enhancing the second visual angle image. The display panel is for displaying the blurred first visual angle image and the enhanced second visual angle image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
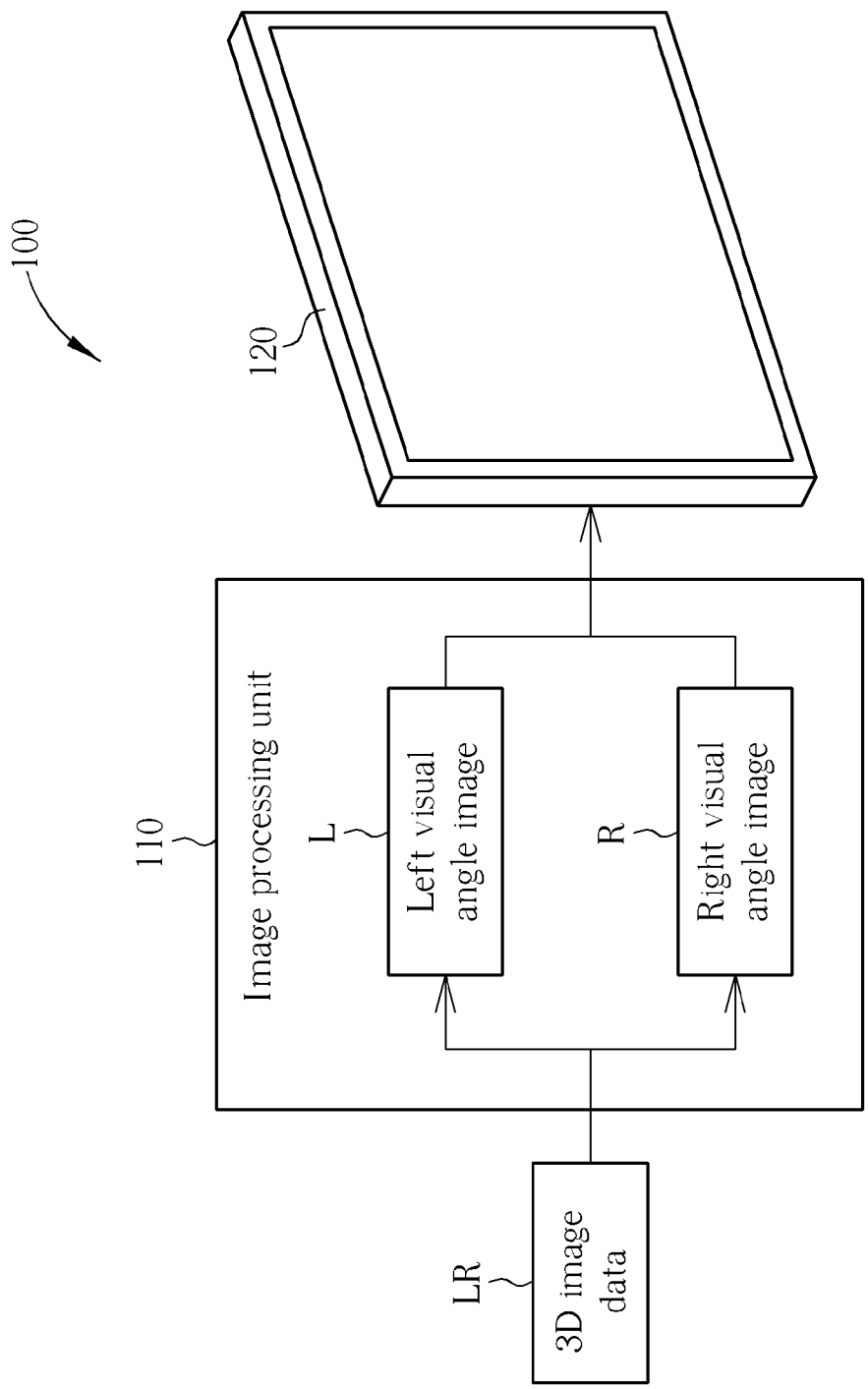
FIG. 1 is a diagram illustrating a 3D image processing method of the prior art.
Figure 2:
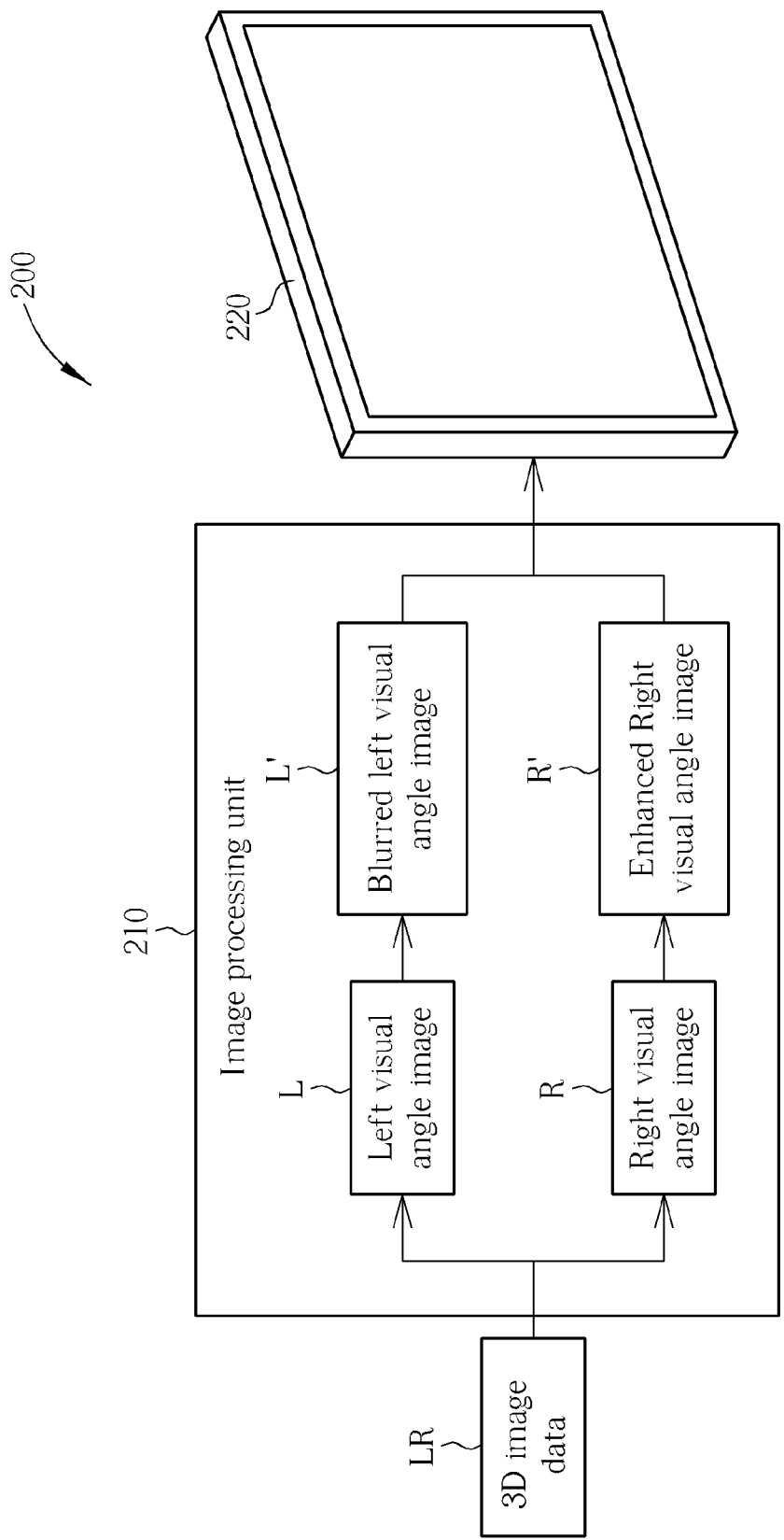
FIG. 2 is a diagram illustrating a 3D image processing method of the present invention.

Please refer to FIG. 2. FIG. 2 is a diagram illustrating a 3D image processing method of the present invention. As shown in FIG. 2, when a 3D display device 200 receives image data LR, an image processing unit 210 of the 3D display device 200 generates a left visual angle image L and a right visual angle image R according to the image data LR. Then the image processing unit 210 processes the left visual angle image L and the right visual angle image R in order to reduce the ghost effect. For example, the image processing unit 210 blurs the left visual angle image L for making edges of objects in the blurred left visual angle image L' unclear. In addition, the image processing unit enhances the right visual angle image R for sharpening edges of objects in the enhanced right visual angle image R'. Then, a display panel 220 displays the blurred left visual angle image L' and the enhanced right visual angle image R' to be seen by a left eye and a right eye of a user respectively in order to form a 3D image visually. Since the blurred left visual angle image L' removes most edge data from the original left visual angle image L while retaining original color data, and the enhanced right visual angle image R' reinforces edge data of the original right visual angle image R, when forming the 3D image visually, edge data of the 3D image is mostly provided from the enhanced right visual angle image R'. Therefore, to a user, even if the left eye sees the right visual angle image partially and the right eye sees the left visual angle image partially, the object of the 3D image only has one edge visually, which further reduces the ghost effect.

In the above embodiment, the present invention takes an example of blurring the left visual angle image and enhancing the right visual angle image. However, the present invention is not limited to the above example. In other embodiments, the present invention can blur the right visual angle image and enhance the left visual angle image, or blur/enhance the left visual angle image and the right visual angle image interlacedly. In addition, a blur degree of an image can be adjusted according to a parameter. When the parameter is 0, the image is not blurred as the original image. As the parameter increases, the blur degree of the image gets higher. Similarly, an enhancement degree of the image can be also adjusted according to a parameter. When the parameter is 0, the image is not enhanced as the original image. As the parameter increases, the enhancement degree of the high-frequency data of the image gets higher.

Figure 3:
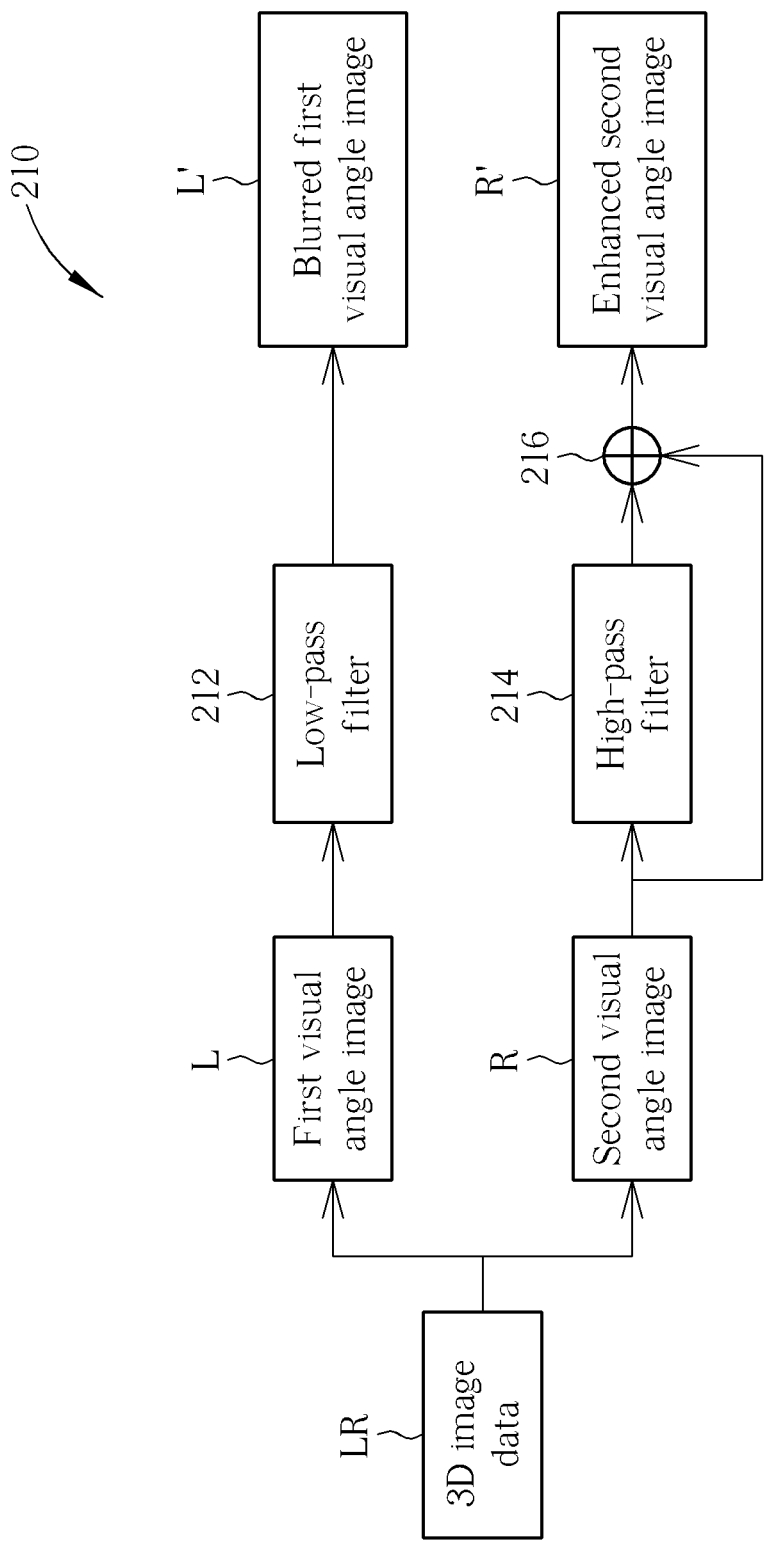
FIG. 3 is a diagram showing an image processing unit 210 of the present invention.

Please refer to FIG. 3. FIG. 3 is a diagram showing an image processing unit 210 of the present invention. As shown in FIG. 3, the image processing unit 210 comprises a low-pass filter 212, a high-pass filter 214, and a signal adder 216. The low-pass filter 212 is for filtering out high-frequency data of the first visual angle image L in order to generate the blurred first visual angle image L'. Frequency of edge data is normally higher in digital image data. Therefore, the edges of objects of the blurred first visual angle image L' are weakened. The high-pass filter 214 is for computing high-frequency data of the second visual angle image R. The signal adder 216 is for adding the computed high-frequency data to the second visual angle image R in order to generate the enhanced second visual angle image R'. The blurred first visual angle image L' and the enhanced second visual angle image R' are generated according to the above image processing procedures. The above low-pass filter 212 can be a Gaussian filter, and the above high-pass filter 214 can be a Laplacian filter. To those skilled in the art, the Gaussian filter and the Laplacian filter can be replaced by other types of filters or algorithms to achieve the same result.

Figure 4:
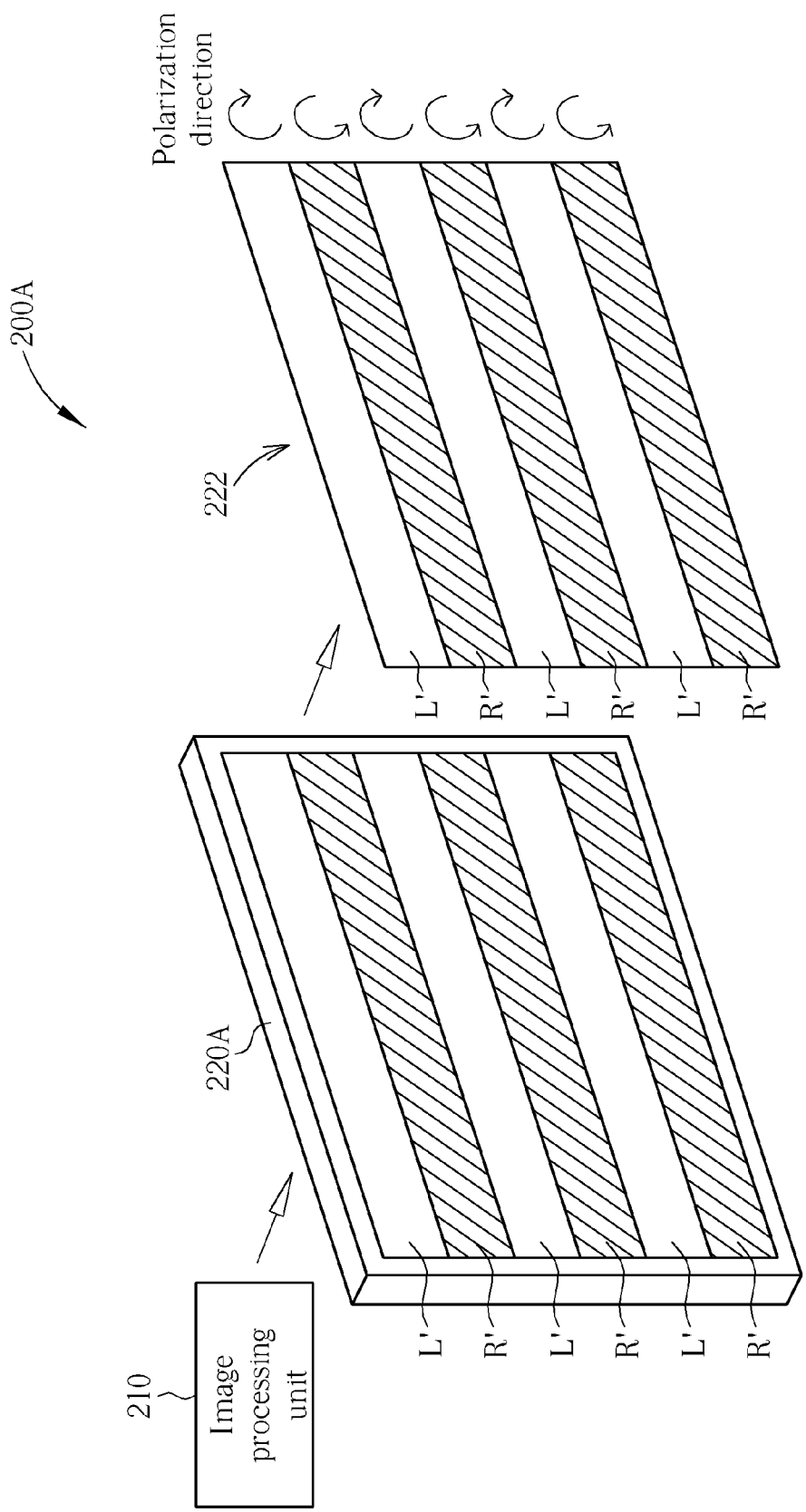
FIG. 4 is a diagram showing a first embodiment of a 3D display device of the present invention.

Please refer to FIG. 4. FIG. 4 is a diagram showing a first embodiment of a 3D display device of the present invention. A display panel 220A of a 3D display device 200A is for displaying the blurred first visual angle image L' and the enhanced second visual angle image R' simultaneously. The display panel 220A further comprises an optical polarization component 222 for arranging a polarization direction of the blurred first visual angle image L' to be different from a polarization direction of the enhanced second visual angle image R', such that the left eye and the right eye of the user can see the blurred first visual angle image L' and the enhanced second visual angle image R' respectively through a pair of polarized glasses.

Figure 5:
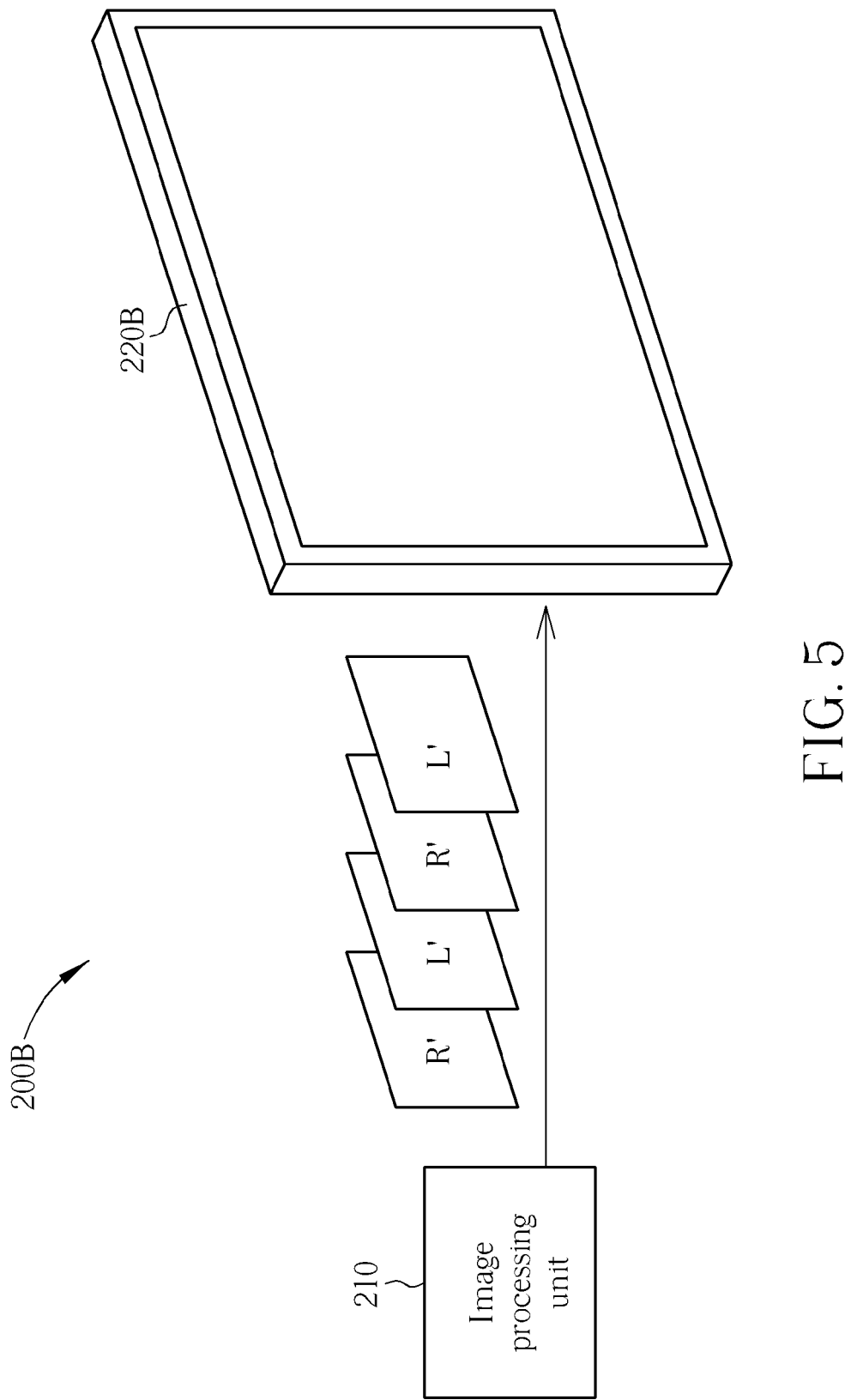
FIG. 5 is a diagram showing a second embodiment of the 3D display device of the present invention.

Please refer to FIG. 5. FIG. 5 is a diagram showing a second embodiment of the 3D display device of the present invention. A display panel 220B of a 3D display device 200B is for displaying the blurred first visual angle image L' and the enhanced second visual angle image R' sequentially, such that the left eye and the right eye of the user can see the blurred first visual angle image L' and the enhanced second visual angle image R' respectively through a pair of shuttering glasses, which shutters a left glass and a right glass sequentially.

Figure 6:
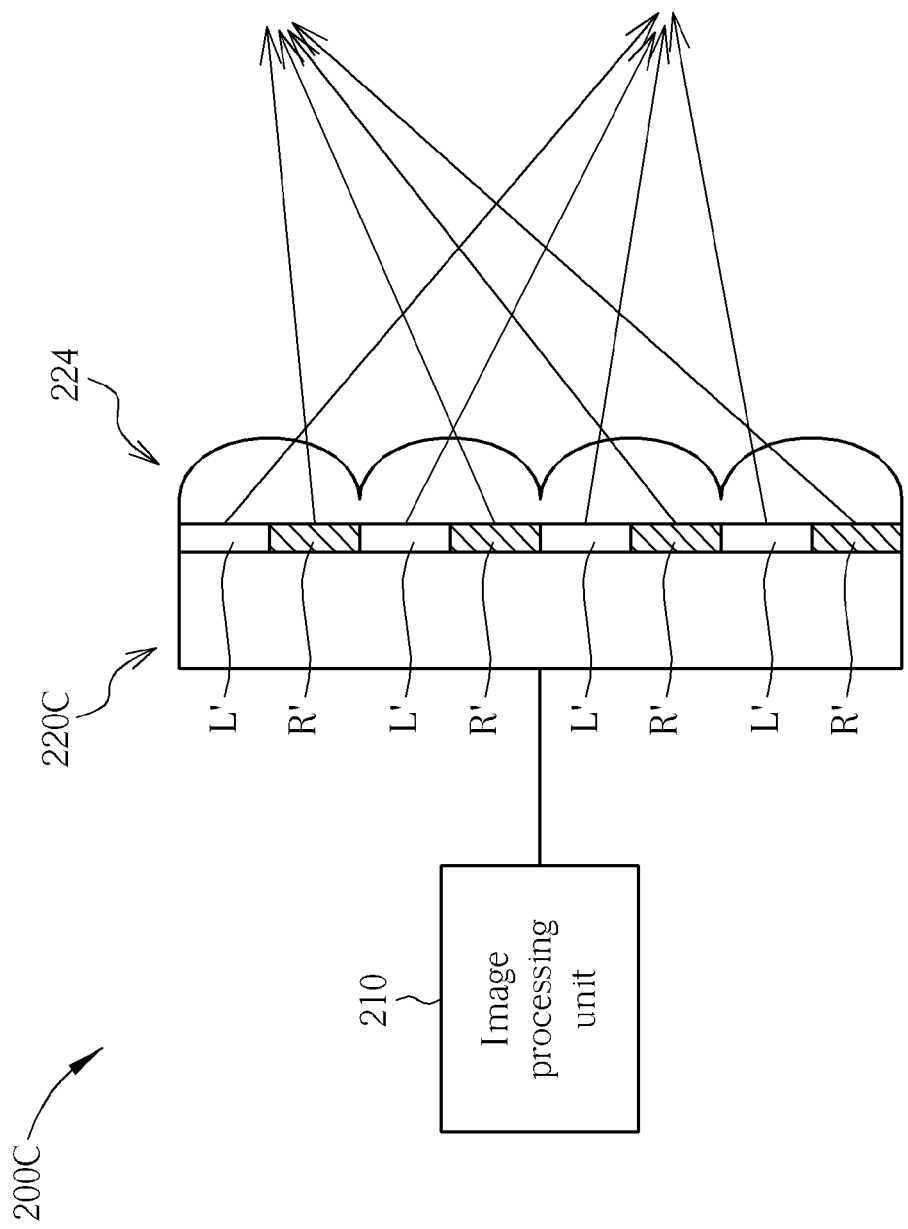
FIG. 6 is a diagram showing a third embodiment of the 3D display device of the present invention.

Please refer to FIG. 6. FIG. 6 is a diagram showing a third embodiment of the 3D display device of the present invention. A display panel 220C of a 3D display device 200C is for displaying the blurred first visual angle image L' and the enhanced second visual angle image R' simultaneously. The display device 200C further comprises a lens film 224. A plurality of lenticular lenses formed on the lens film 224 are for projecting the blurred first visual angle image L' and the enhanced second visual angle image R' in different projection angles. The left eye and the right eye of the user can directly see the blurred first visual angle image L' and the enhanced second visual angle image R' respectively without wearing any glasses.

Figure 7:
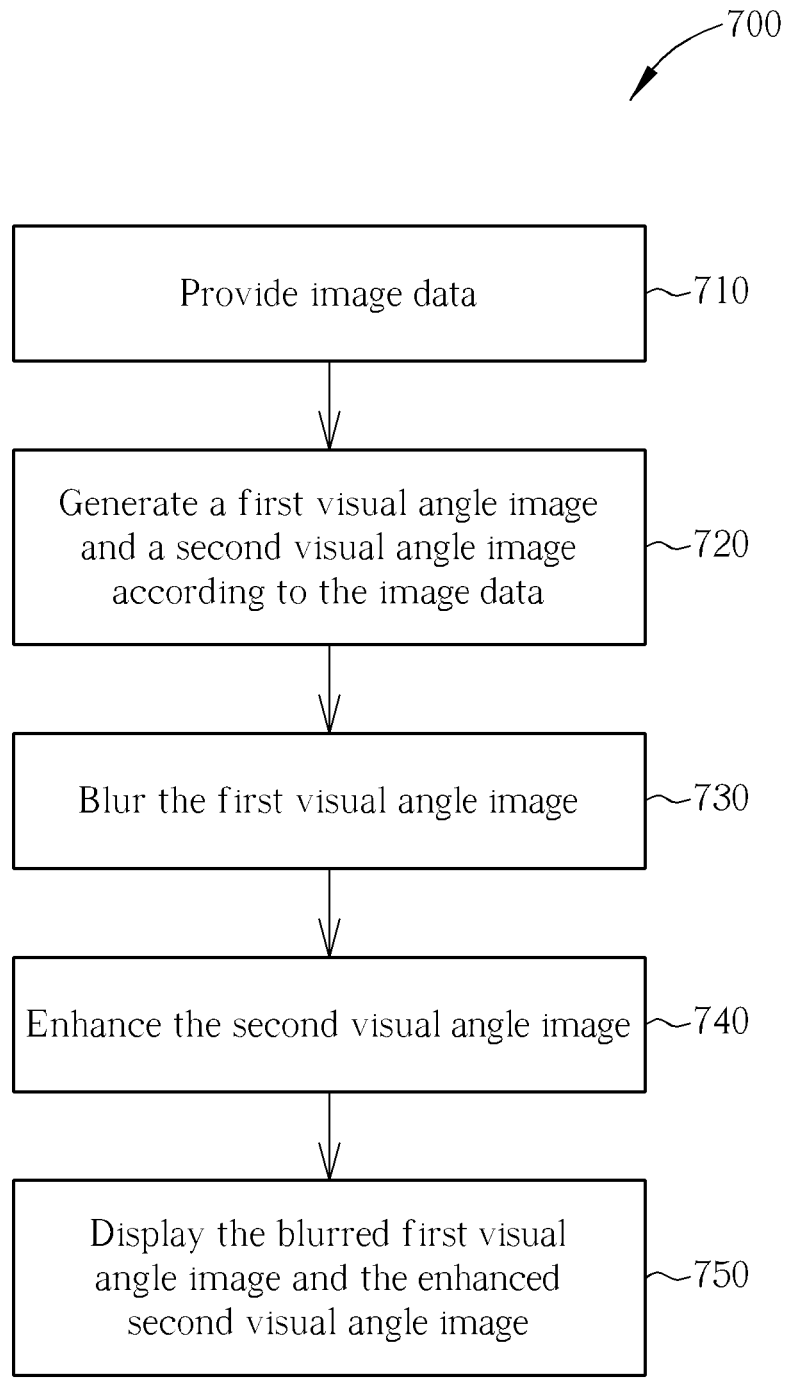
FIG. 7 is a flowchart showing a 3D image processing method of the present invention.

Please refer to FIG. 7. FIG. 7 is a flowchart 700 showing a 3D image processing method of the present invention. The flowchart of the 3D image processing method of the present invention comprises the following steps:

Step 710: Provide image data;
Step 720: Generate a first visual angle image and a second visual angle image according to the image data;
Step 730: Blur the first visual angle image;
Step 740: Enhance the second visual angle image; and
Step 750: Display the blurred first visual angle image and the enhanced second visual angle image.

Basically, the steps of the flowchart 700 need not be in the exact order shown and need not be contiguous, that is, other steps can be inserted between. In addition, the step 730 need not be behind the step 740. The step 730 and the step 740 can be conducted simultaneously.

Summarizing the above, the 3D image processing method of the present invention allows the user to receive edge data from only one visual angle image by blurring the first visual angle image and enhancing the second visual angle image. Therefore, each object of the 3D image only has one edge, which further reduces the ghost effect.

In contrast to the prior art, the present invention provides a 3D image processing method to reduce the ghost effect, which not only prevents brightness reduction of the image, but also reduces complexity of a hardware structure of the 3D display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A 3D image processing method with a reduced ghost effect, comprising:
   providing image data;
   generating a first visual angle image and a second visual angle image according to the image data;
   performing image processing to apply a blurring parameter for blurring and not sharpening the first visual angle image and apply a sharpening parameter for sharpening and not blurring the second visual image; and
   displaying the first visual angle image which is only blurred and the second visual angle image which is only sharpened;
   wherein performing image processing on the second visual angle image comprises:
      computing high-frequency data of the second visual angle image; and
      generating the sharpened second visual angle image by adding the computed high-frequency data to the second visual angle image.

2. The method of claim 1, wherein performing image processing on the first visual angle image comprises filtering out high-frequency data of the first visual angle image.

3. The method of claim 2, wherein filtering out the high-frequency data of the first visual angle image is filtering out the high-frequency data of the first visual angle image according to a Gaussian filter mask.

4. The method of claim 1, wherein computing the high-frequency data of the second visual angle image is computing the high-frequency data of the second visual angle image according to a Laplacian filter mask.

5. The method of claim 1, wherein displaying the first visual angle image which is only blurred and the second visual angle image which is only sharpened is displaying the blurred first visual angle image and the sharpened second visual angle image simultaneously.

6. The method of claim 1, wherein displaying the first visual angle image which is only blurred and the second visual angle image which is only sharpened is displaying the blurred-first visual angle image in a first time slot and displaying the sharpened second visual angle image in a second time slot.

7. The method of claim 1, wherein performing image processing on the first visual angle image comprises blurring edges of objects of the first visual angle image.

8. The method of claim 1, wherein performing image processing on the second visual angle image comprises sharpening edges of objects of the second visual angle image.

9. The method of claim 1, wherein performing image processing on the first visual angle image and the second visual image is performing image processing on the first visual angle image and the second visual image simultaneously.

10. A 3D display device with a reduced ghost effect, comprising:
- an image processing unit for receiving image data, generating a first visual angle image and a second visual angle image according to the image data, and performing image processing to apply a blurring parameter for blurring and not sharpening the first visual angle image and apply a sharpening parameter for sharpening and not blurring the second visual image, the image processing unit comprising:
  - a high-pass filter for computing high-frequency data of the second visual angle image; and
  - a signal adder for adding the computed high-frequency data to the second visual angle image in order to generate the sharpened second visual angle image; and
- a display panel for displaying the first visual angle image which is only blurred and the second visual angle image which is only sharpened.

11. The 3D display device of claim 10, wherein the image processing unit further comprises:
- a low-pass filter for filtering out high-frequency data of the first visual angle image in order to generate the blurred first visual angle image.

12. The 3D display device of claim 11, wherein the low-pass filter is a Gaussian filter.

13. The 3D display device of claim 10, wherein the high-pass filter is a Laplacian filter.

14. The 3D display device of claim 10, wherein the display panel is for displaying the blurred first visual angle image and the sharpened second visual angle image simultaneously.

15. The 3D display device of claim 14, further comprising an optical polarization component for arranging a polarization direction of the blurred first visual angle image to be different from a polarization direction of the sharpened second visual angle image.

16. The 3D display device of claim 14, further comprising a lens film for projecting the blurred first visual angle image and the sharpened second visual angle image in different projection angles.

17. The 3D display device of claim 10, wherein the display panel is for displaying the blurred first visual angle image in a first time slot and displaying the sharpened second visual angle image in a second time slot.

18. The 3D display device of claim 10, wherein the blurred first visual angle image is the first visual angle image with objects having blurred edges.

19. The 3D display device of claim 10, wherein the sharpened second visual angle image is the second visual angle image with objects having sharpened edges.

20. The 3D display device of claim 10, further comprising an optical polarization component for arranging a polarization direction of the blurred first visual angle image to be different from a polarization direction of the sharpened second visual angle image.

21. The 3D display device of claim 10, further comprising a lens film for projecting the blurred first visual angle image and the sharpened second visual angle image in different projection angles.

22. The 3D display device of claim 10, wherein the image processing unit is configured to perform image processing on the first visual angle image and the second visual image simultaneously.

* * * * *

UNITED STATES PATENT AND TRADEMARK OFFICE
CERTIFICATE OF CORRECTION

PATENT NO. : 9,497,436 B2  
APPLICATION NO. : 13/346731  
DATED : November 15, 2016  
INVENTOR(S) : Wei et al.

Page 1 of 1

It is certified that error appears in the above-identified patent and that said Letters Patent is hereby corrected as shown below:

On the Title Page

Item (54) Title should read:  
--"3D IMAGE PROCESSING METHOD WITH A REDUCED GHOST EFFECT AND 3D DISPLAY DEVICE THEREOF"--

Signed and Sealed this  
Sixteenth Day of May, 2017

Michelle K. Lee  
*Director of the United States Patent and Trademark Office*